(12) United States Patent
O'Gallcobhair

(10) Patent No.: US 6,964,145 B1
(45) Date of Patent: Nov. 15, 2005

(54) PACKAGING FOOD PRODUCTS

(75) Inventor: Liam Michael O'Gallcobhair, Aherlow (IE)

(73) Assignee: Dairygold Technologies Limited, (IE)

( * ) Notice: Subject to any disclaimer, the term of this patent is extended or adjusted under 35 U.S.C. 154(b) by 178 days.

(21) Appl. No.: 10/070,570

(22) PCT Filed: Sep. 8, 2000

(86) PCT No.: PCT/IE00/00103

§ 371 (c)(1),
(2), (4) Date: Nov. 25, 2002

(87) PCT Pub. No.: WO01/17852

PCT Pub. Date: Mar. 15, 2001

(30) Foreign Application Priority Data

Sep. 9, 1999 (IE) .................................... S990760

(51) Int. Cl.⁷ ............................................. B65B 47/00
(52) U.S. Cl. ........................... 53/453; 53/478; 53/412; 53/133.1
(58) Field of Search .................... 53/453, 478, 412, 53/415, 133.3, 136.1, 136.3, 133.1

(56) References Cited

U.S. PATENT DOCUMENTS

| | | | | |
|---|---|---|---|---|
| 4,656,042 A | * | 4/1987 | Risler | 426/396 |
| 4,771,903 A | * | 9/1988 | Levene et al. | 215/232 |
| 5,103,618 A | * | 4/1992 | Garwood | 53/433 |
| 5,195,298 A | * | 3/1993 | Baranowski | 53/425 |
| 5,524,419 A | * | 6/1996 | Shannon | 53/431 |
| 5,729,958 A | * | 3/1998 | Kearney et al. | 53/440 |
| 5,765,345 A | * | 6/1998 | Svec | 53/453 |
| 5,941,054 A | * | 8/1999 | Valyi | 53/453 |
| 6,138,439 A | * | 10/2000 | McMahon et al. | 53/412 |
| 6,282,870 B1 | * | 9/2001 | Robache | 53/453 |
| 6,662,531 B1 | * | 12/2003 | Schwab et al. | 53/453 |

* cited by examiner

Primary Examiner—Sameh H. Tawfik
(74) Attorney, Agent, or Firm—Ipsolon llp

(57) ABSTRACT

A process for packaging a food product such as soft ice-cream, frozen yogurt or the like in a single-serving package comprises a continuous in-line system in which a pot (9) is formed in a deformable bottom web (2) of plastics material and a lid (12) with dispensing aperture (14) is formed in a top web (4) of plastics material. Food product is filled into the formed pot and the webs are brought together in register with a lid aligned over the mouth of the pot. The lid is sealed to the pot at a sealing station and the aperture in the lid is covered and sealed with a peel-off tab or label (16). To dispense the product for consumption, the tab is removed and the product is extruded by pressing down on the deformable pot to collapse it, forcing the product through the aperture in the lid. To facilitate this, at least a portion of the lid is formed so as to be sufficiently rigid as to provide a bearing surface toward which the pot can be collapsed. In an alternative arrangement, the bearing surface can be provided by a rigid insert (34) placed in the package between the food product and the lid and in this case the lid may be formed from a flimsy material.

23 Claims, 5 Drawing Sheets

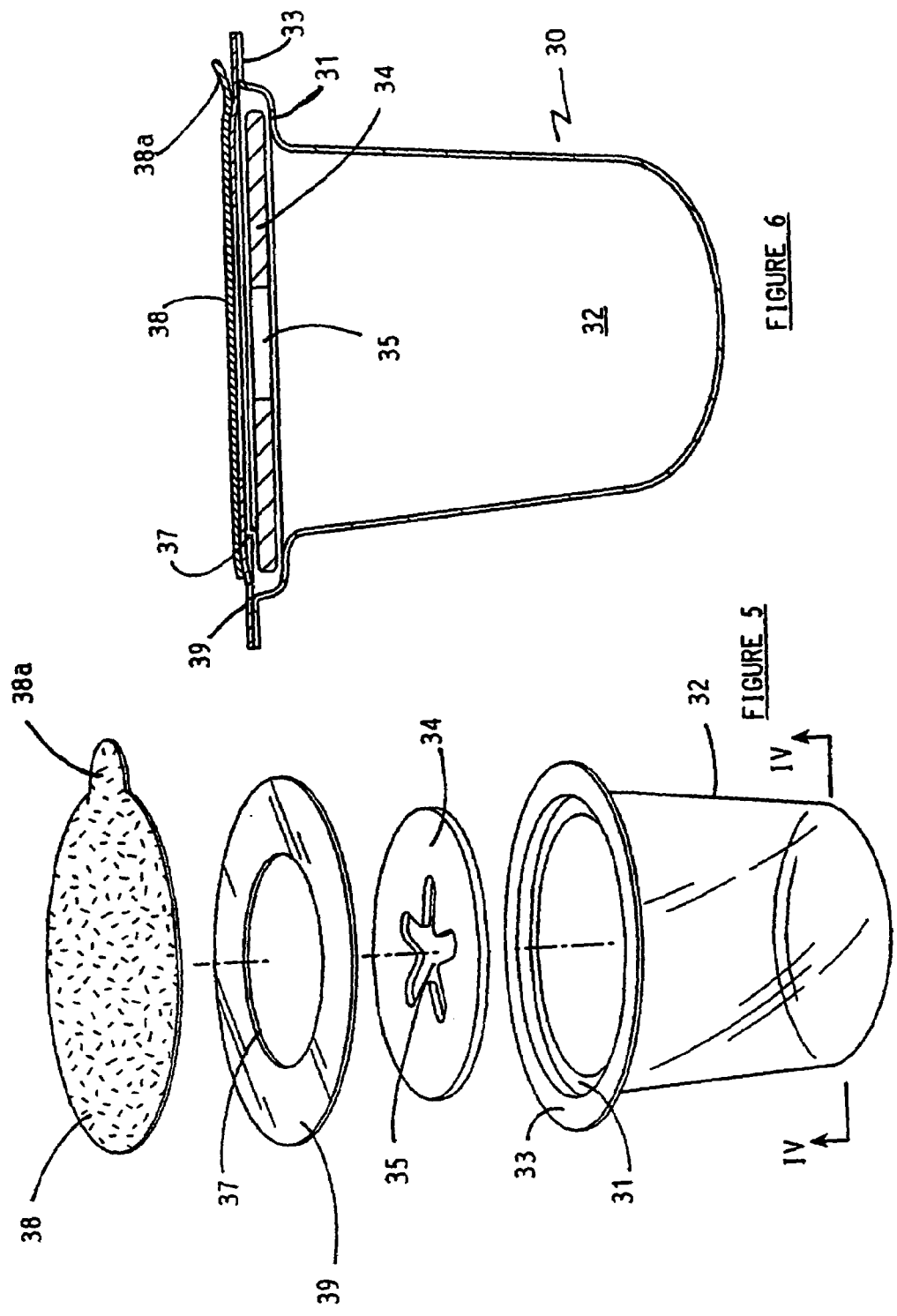

PACKAGING FOOD PRODUCTS

This application is a 371 of PCT/IE/00103 filed Sep. 8, 2000.

FIELD OF THE INVENTION

The present invention relates to packaging for soft ice-cream, frozen yoghurt sherbert and the like products and in particular to a system for packaging such products in a single or family size serving dispenser.

BACKGROUND

Traditionally, soft frozen products such as soft (aerated) ice cream are prepared at the point of sale and then dispensed into a suitable receptacle such as an edible wafer cone for consumption. Demands for better food safety and hygiene standards have more recently led food suppliers to move away from the traditional product toward a system in which individual portions are pre-prepared and packed, ready to be dispensed at the point of sale or consumption in a hygienic fashion which allows for the avoidance of cross-contamination between the dispensing equipment and the product.

One such system disclosed in EP 0 674 482B comprises a substantially rigid cup for holding the frozen product, the cup having an aperture in its base through which the product may be dispensed. Over the mouth of the filled cup is sealed a flexible membrane which is sized to have a surface area which matches the surface area of the interior of the cup. At the point of sale, a plunger is brought to bear on the flexible membrane, forcing it into the interior of the cup and at the same time causing the product to be dispensed through the aperture. The emptied cup is then discarded. Since the plunger never contacts the product per se, the dispensing equipment remains clean irrespective of how many portions are served and cross-contamination between different flavoured servings is avoided. However, these cups may crack from time to time under the force applied during dispensing and furthermore, the cups are relatively complex and expensive to manufacture and fill.

Also know is a one-serving ice-cream dispenser comprising a rigid cylinder having an open end and a partially closed end. The partially closed end is shaped as a truncated cone, with the area about the would-be tip of the cone cut away to form a star-shaped dispenser opening. Also provided is a rigid plunger bead shaped to match the inner circumference of the cylinder and having a conical nose shaped to match the cone-shaped end of the cylinder. Product is filled into the open end of the cylinder, the body of which is sized to hold one serving. It is prevented from escaping through the opening by the provision of a removable tab over the outside of the opening. Once filled, the plunger head is placed into the cylinder with its nose facing inwardly. When it is desired to dispense the ice cream, the tab is removed and a plunger rod engages the plunger head, and forces it along the cylinder until all the product is extruded through the opening. Then, the cylinder and plunger head are discarded. This arrangement is hygienic and convenient for the end user, but is somewhat expensive.

SUMMARY OF THE INVENTION

The present invention seeks to overcome the disadvantages of the known prior art by providing a relatively simpler package and packaging system for edible products.

The present invention provides a process for packaging a food product comprising:
a) advancing a base web of thermoformable material to a forming station and thermoforming a portion of the web at the forming station into at least one pot; and
b) transferring the web with formed pot to a, filling station and filling the pot with the food product;
at the same time
c) advancing a top web to a punching station and punching at least one product dispensing aperture in the web;
and thereafter conducting the further steps of
d) bringing the base and top webs together in register so that an area of top web defining a lid and having a punched aperture therein overlies a mouth of a filled pot and sealing the lid to the pot to form a food package;
e) advancing the package or packages to a cooling chamber and holding them suspended therein until the product in the package has solidified; and
f) fixing a sealing member over the aperture at any point after step c.

In one arrangement the pot is deformable toward the lid to dispense the food product through the aperture in the lid and the lid or a portion thereof is provided with sufficient rigidity to enable the pot to be collapsed against it. The top web used is thermoformed to fabricate it into a truncated dome-shaped lid and the aperture is formed in the planer surface of the dome. Conveniently, the aperture is shaped so as to impart a desired cross- sectional shape to product extruded through the aperture.

In another arrangement the pot is deformable toward the lid to dispense the food product through the aperture in the lid and a rigid insert is provided intermediate the lid and the food product in the pot to provide a bearing surface against which the pot can be collapsed, the insert having a dispensing opening in register with the aperture of the lid to enable the food product to be dispensed therethrough. The dispensing opening is shaped so as to impart a desired cross-sectional shape to product extruded through the opening and a shoulder is formed adjacent the mouth of the pot for receiving the insert.

The finished packages are preferably separated from the web after the sealing of the aperture by cutting the area of webs between adjacent packages or groups of packages. Alternatively, the areas between adjacent packages or groups of packages may be scored to enable individual packages or groups of packages to be snapped apart. Conveniently, the packages are separated into groups of 2, 4, 6 or 8 and score mark are made in the web between the packages in the group to facilitate separation of one package from another.

In a further step, the packages or groups of packages are transferred from the cooling chamber to a packaging area. The process is preferably carried out as a continuous, in-line process.

The invention also provides an apparatus for conducting a process according to any of the preceding claims, including a first forming station for forming a pot in a first web of thermoformable material, a second forming station for forming a apertured lid in a second web of thermoformable material, a filling station for filling a food product into a formed pot, a sealing station for sealing the lid to the pot and a station for fixing a sealing member over the aperture in the lid to close and seal the food in the so-formed package.

In one arrangement a picking station is provided for placing a rigid insert into the filled pot prior to the application of the lid and the first forming station includes means for forming a shoulder in the pot for receiving the insert.

The invention still further provides a package for a food product which is flowable at point of consumption the package comprising a pot for holding the food product and an apertured lid through which the food product is dispensable the pot being formed of a flimsy material and being collapsable toward the lid to dispense the food product through the aperture of the lid, the package including a bearing surface to enable the pot to be collapsed against the lid. In one arrangement the lid is formed from a material having a rigidity greater than that of the material of the pot and sufficient to enable the pot to be collapsed against the lid. In an alternative arrangement the bearing surface comprises a rigid insert placed intermediate the food product and the lid, the insert having a dispensing opening in register with the aperture of the lid to permit the food product to be dispensed therethrough.

The invention will now be described more particularly with reference to the accompanying drawings which show, by way of example only, embodiments of an in-line packing system according to the invention.

BREIF DESCRIPTION OF THE DRAWINGS

In the drawings:

FIG. 5 is an exploded view of the package produced on the apparatus of FIG. 4; and FIG. 6 is a sectional view of the package of FIG. 5, when assembled, taken along the line VI—VI of FIG. 5.

DETAILED DESCRIPTION OF PREFERRED EMBODIMENTS OF THE INVENTION

Figure 1:
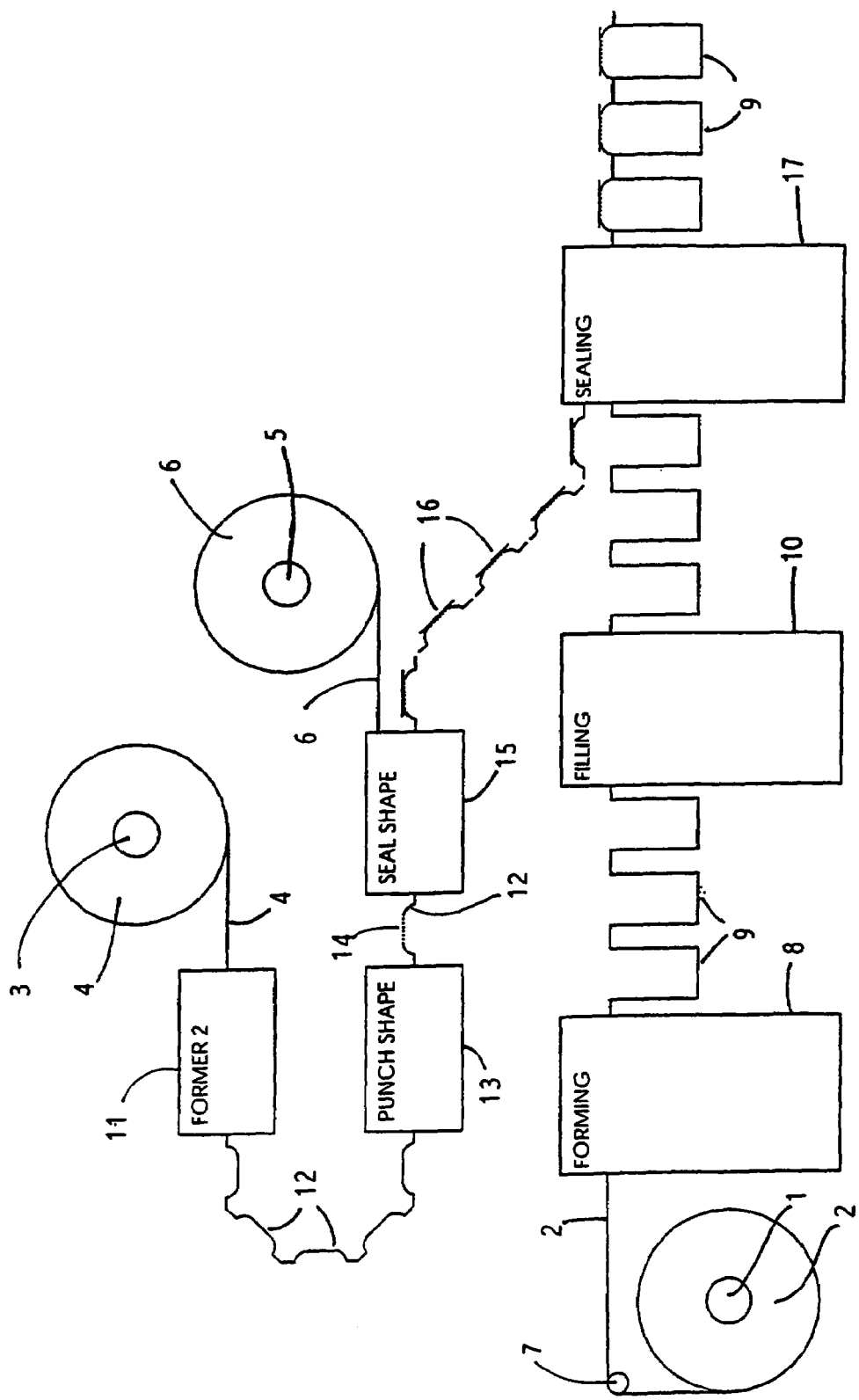
FIG. 1 is a schematic drawing illustrating the various steps of one embodiment of an in-line packaging system according to the invention.
Figure 2:
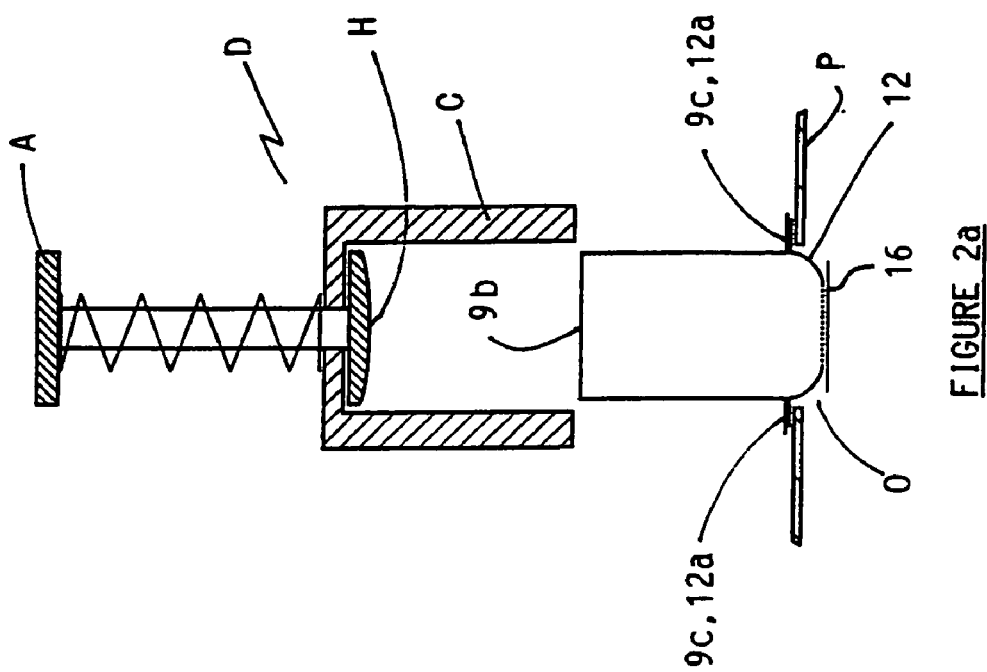
FIGS. 2a to 2c depict schematically the steps of dispensing product from a lidded container prepared by the scheme shown in FIG. 1.

Referring to FIG. 1, the main steps of a first embodiment of a process for in-line forming of a cup-like container or pot, filling the container with product, lidding and sealing the container and finally chilling the prepared packages are shown schematically. Reel 1 carries a roll of a deformable flexible web 2 of material which ultimately becomes the cup- like container or pot for the product. Web 2 is fed via guide 7 to a forming station 8. Deformable web 2 can be comprised of any suitable plastics material which is known in the art and which is capable of retaining an allocated, thermoformed shape which has sufficient strength to withstand the normal conditions which product packages of the type discussed herein (such as ice-cream and frozen yoghurt) encounter during manufacture, transport and handling, yet is filmsy enough to collapse under dispensing pressure as will be described below in relation to FIG. 2. Polyethylene or nylon poly films are suitable for such purpose. One particular material which is suitable for this purpose is film of thickness 100 micrometers, such as a laminated nylon/low density polyethylene film of 100 micrometers thickness, of which 40 micrometers is the nylon layer and 60 micrometers is the thickness of the low density polyethylene layer.

On being transported into forming station 8, web 2 is subjected to thermoforming by a die (not shown) located within the station 8 so as to form it into a series of pots 9, each of which is sufficiently filmsy so that the pot will deform and crush under pressure. By providing the web 2 in a desirable width and by providing forming station 8 with an appropriate number of shaping dies, any desired number of pots 9 can be formed simultaneously at the forming station 8, including the formation of an array of pots 9.

As web 2 with formed pots 9 continues to advance, the pots 9 pass to and through a filling station 10 at which the pots 9 are filled singly or simultaneously with product. So as to minimise any distortion of the pot during fling, the filler nozzle may be lowered near to the base 9b (FIG. 3) of the pot before discharging product, and the filler nozzle is withdrawn from the pot during filling so that it remains close to but above the rising level of product in the pot. This also avoids the possibility of air pockets becoming trapped in the product.

Simultaneously with the forming and filling of the pots 9, lids for the pots 9 are formed from a web 4 carried on reel 3. Web 4 is comprised of any suitable material which has sufficient strength and rigidity to enable it to suspend from it the weight of a filled pot 9, as will be described below. One suitable material for this purpose is high density polyethylene of about 1 mm thickness. Preferably, the web 4 material is the thermoformable however, this is not essential to the invention. In the case where a thermoformable web 4 is selected, it is optionally advanced to a lid forming station 11, at which it is thermoformed by a dye (or series of dyes) into a contoured shape to be described below in relation to FIG. 3 to form lids 12 which remain connected together at this stage.

Irrespective of whether or not contoured lids 12 are formed in it, the web 4 is next advanced to a punching station 13 at which a dispensing aperture 14 is punched through each lid 12. At the point of sale or consumption, the product is dispensed from the pot through the aperture 14 and since products such as whipped or aerated ice-cream are habitually extruded through a star-shaped nozzle, it is preferred that aperture 14 should likewise be star shaped to apply the desired cross-sectional shape to the extruded product.

After punching, web 4 advances to a sealing station 15 at which aperture 14 is covered with a removable seal. The seal is drawn from a web 6 of sealing film which is fed from a reel 5. At sealing station 15, a seal 16 is cut from web 6 and applied to the area of the lid 12 about the aperture 14 and is fixed thereto to seal the aperture. Alternatively, web 6 may be a carrier for pre-cut, individual seals 16. The seals 16 may be of metal foil, waxed paper, filmsy polyethylene or any other material which is suitable for sealing with the material of the lid web 4. It is advantageously coated with adhesive which may be of the heat activated type or with heat scalable lacquer or with other suitable fixing means. The seals are advantageously pre-printed with product and/or proprietary information.

Figure 3:
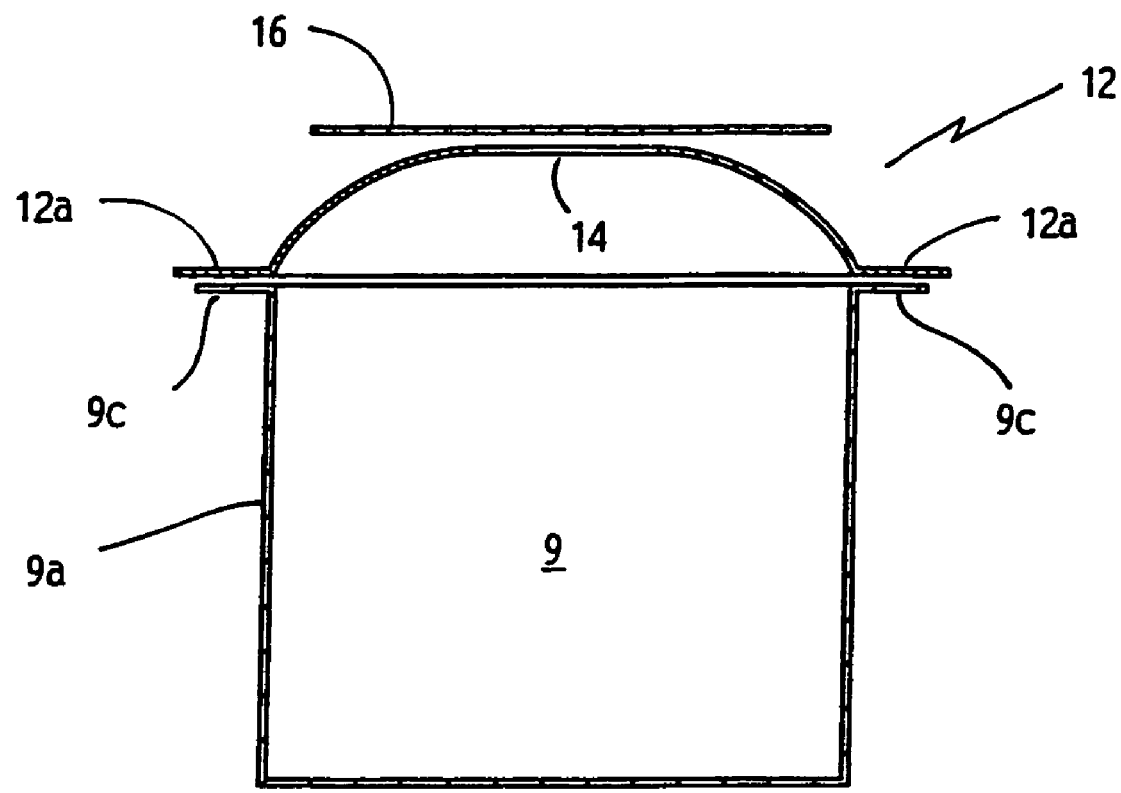
FIG. 3 is a elevation view of a package according to the invention prepared by the system of FIG. 1.

At assembly station 17, the filled pots 9 and sealed lids 12 are brought together and a lid 12 is sealed over the mouth of each pot 9 to form a product package as shown in FIG. 3. Whilst FIG. 3 shows a single product, it is to be understood that a number of individual packages may remain connected to one another in a chain or array ready to be separated from one another at any time up to the point of dispensing. The final separated package shown in FIG. 3 comprises the pot 9 having a relatively thinner wall 9a and base 9b and a relatively thicker flange 9c extending outwardly about the mouth of the pot, the flange 9c having the thickness of the web 2 from which the pots are thermoformed. Lid 12 has a contoured truncated dome shape with an outwardly extending flange 12a. At the assembly station 17, the flanges 9c of the pot and 12a of the lid are sealed together. Seal 16 is sized to overlap beyond the aperture 14 to provide a free end which can easily be grasped to enable the seal to be removed from the lid.

Various known sealing means may be employed to seal the lid 12 to the pot 9, including but not limited to heat sealing or ultrasound welding.

Moreover at assembly station 17 or optionally at a station dowse from it (not shown), cuts are provided wholly or partially to cut through the sealed together flanges 9c, 12a to separate the individual packages from one another or to weaken the flanges between pots so that individual packages can be broken or snapped apart. Conveniently, the cutters partially cut through or score the webs by cutting in a direction which cuts wholly through the relatively thinner flange 9a of the pot and partially through the relatively thicker flange 12a of the lid. The latter enables the pots to be retained together during storage and transport, yet rendering them easily separable from one another by being snapped apart.

The sealed flanges 9c, 12a provide a means by which the filled pot or pots may be suspended from a fame, grid or rack and this feature is particularly advantageous where the product is a frozen product. In order to enable it to be pumped for filling at the filling station 10, such a product must at that stage be at a temperature at which it is sufficiently soft to be pumpable. For a product such as whipped ice cream, the temperature for filling will be typically between –1° C. and –10° C. After the packages are sealed, they transferred to a cooling chamber, which may be a continuous chamber, and the product is cooled in the cooling chamber down to a temperature of between –15° C. and –30° C. to freeze it solid. Whilst the pots 9 are crushable, they have sufficient intrinsic strength to enable them substantially to retain their thermoformed shape during the steps from filling to freezing. Since they can be moved to and through the cooling chamber suspended from the lids rather than resting on their bases, a superior circulation of cooling air about the pot can be achieved, enabling optimal conditions for product quality assurance to be maintained dung freezing. Thus, the time that the packages spend in the cooling chamber can be controlled more easily to ensure that freeing occurs at a rate sufficient to avoid the growth of ice crystals to a size which would adversely affect the organoleptic qualities of the ice cream. Once the product is frozen solid, the packages will retain their shape so long as the temperature of the product is maintained below the point at which the product is solid and accordingly, further steps of packing, palletising and sporting can be undertaken without risk to the product shape, despite the relatively filmsy nature of the pot.

Seal 16 need not be applied to the lid 12 directly after punching station 13, and in fact, this step can be carried out at any point in the process after the punching of aperture 14 in the lid 12 and prior to boxing of the packages.

When it is desired to dispense the product, an individual package is moved to a tempering cooler held at a suitable tempering temperature and held there until the product has warmed throughout to that temperature to resume a soft, flowable state.

When it is desired to dispense the product, the package is removed from the tempering cooler and placed, lid 12 facing down, in a retaining aperture 0 formed in a holding plate P as shown in FIG. 2a. The package is retained in place with the lid 12 extending through the aperture 0 by means of the engagement of the flanges 9c, 12a with the plate P. The collar C of dispenser D is placed over the inverted pot 9 (see FIG. 2b). The seal 16 is peeled away to expose the aperture 14 of the lid either at this stage or on removal of the package from the cooler. Next, and as shown in FIG. 2c, the product is dispensed from the package by pressing downward on plunger A causing the plunger head H to press against the base 9b of pot 9. As pressure develops and continues to be exerted, head H travels down inside collar C, causing pot 9 to crush toward lid 12 and causing its contents to be expelled through apt 14 into a waiting receptacle (not shown). During the crushing, collar C guides pot 9 to crush straight toward the lid and this ensures that practically all the product is dispensed, rather than allowing a portion of it to become trapped in a pocket of the pot which could form were the pot to be allowed to move sideways as it is crushed.

Head H is contoured to match the shape of the lid 12 to ensure that all the contents of the pot are dispensed. Thereafter, the crushed, empty package is discarded to waste and the dispenser is ready for reuse. No cleaning is required even when changing between product flavours, since the product never comes into direct contact with the dispenser. Furthermore, since the aperture 14 stands clear of the plate P, this plate does not come into contact with product and accordingly, no cross-contamination can occur. Thus, the product presented to the consumer is as safe and as hygienic as it was when it was first packaged.

The material of the lid 12 will be chosen to be sufficiently strong so that it can (1) support the weight of a filled pot suspended from it, (2) support the inverted pot during dispensing against the pressure exerted by the plunger tending to deform it (possibly causing the package to slip through aperture 0) and (3) retain the allocated shape, star—or otherwise of the aperture 14 so that the material about this aperture does not deform or bend unduly during dispensing causing the product to be extruded not in accordance with the desired shape.

An alternative embodiment of a process, apparatus and package according to the invention will now be described with reference to FIGS. 4 to 6. The process of the second embodiment is similar in many respects to that described above in connection with the first embodiment and comments made in respect of the first embodiment apply also, where appropriate, mutatis mutandis to the second embodiment. This embodiment differs from the one described formerly in that the lid is fabricated from a material which is as flimsy as the thermoformed walls and base of the pot.

Figure 4:
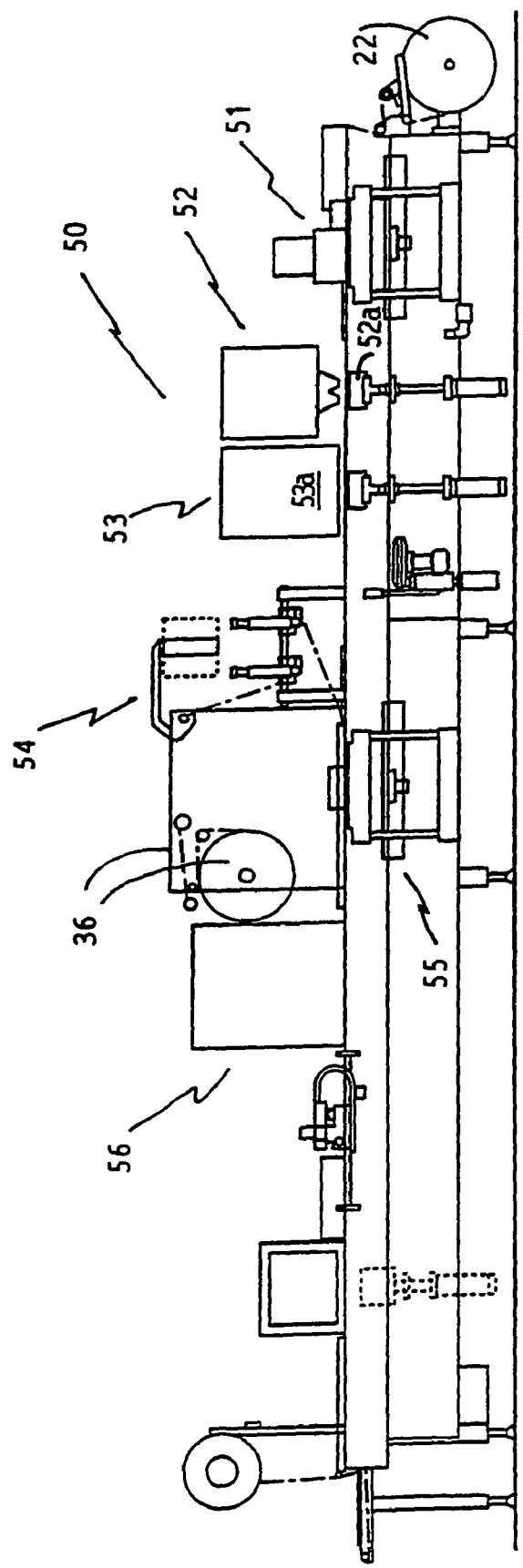
FIG. 4 is a schematic drawing of an apparatus suitable for conducting a second embodiment of an in-line packaging system according to the invention.

Referring to FIGS. 4 to 6, the apparatus generally designated 50 in FIG. 4 is adapted to produce an assembled package of the type shown in FIG. 6 and generally designated 30. Apparatus 50 includes a reel for holding a roll of deformable bottom web material 22 which is deformed to form a pot 30, or row, column or array of pots 30 at forming station 51. The forming die (not shown) at filling station 51 is shaped to form a shoulder 31 adjacent the mouth of the pot 30 intermediate the body 32 of the pot 30 and a flange 33 extending radially outwardly about the pot mouth. Essentially, the flange 33 comprises an undeformed portion of the original bottom web material 22. From there, the pots are conveyed to filling station 52 and filled as described above in relation to the first embodiments. A mould 52a is provided at filling station 52 to support the pot as it is being filled. Next the web 22 with pots 30 now formed in it is advanced to denester station 53, at which a disc 34 of a rigid material is picked from a stack of discs 34 held in cassette 53a and placed into the opening of a pot 30 so as to rest on the shoulder 31 above the food product. Disc 34 is formed with a star-shaped dispensing opening 35.

Simultaneously, top web 36 is advanced from a reel to a thumb-hole punching station 54 at which discs sized to be larger than the opening 35 in the disc 34 are punched out of the web 36. Thence, the web 36 is advanced to meet the bottom web 2.2 with filled pots 30 at sealing station 55. This is done in a manner such that the two webs are brought together in register so that punched thumb hole 37 of the top web "lid" 39 lies above the star-shaped dispensing opening 35 of disc 34 retained in pot 30. At the sealing station 55, a seal is formed between the bottom and top webs 22, 36 about the circumference of the sections of the webs which comprises flange 33 is the final pot 30, as shown in FIG. 6.

Once the seal is formed, a peel-off label 38 with a finger tab 38a is applied to the pot at labelling station 56. The label 38 closes and seals the opening 37. Thereafter, the web is conveyed to stations at which product information print is applied to the individual packages of food product, which are subsequently separated from the web. At an appropriate point, the packages are conveyed to a freezer. Suitable moulds may be provided at and/or intermediate the various stations to support the filled pots as they are conveyed through the apparatus and/or to re-conform them to the desired shape for freezing. Cooling may be provided as necessary at the various stations. For example, at filling station 52, the temperature will optimally be retained low when a soft ice-cream is being filled, since a suitable temperature for this product while being pumped into the pots is about −8° C.

When it is desired to dispense the product from the filled pot 30, a person removes the package from a tempering cooler and tears off label 38 using finger tab 38a to expose the dispensing outlet comprised of the passage through star shaped opening 35 and thumb-hole 37. The pot is placed upside down in a dispenser with the rigid disc 34 bearing against the surface of a dispenser platform and the dispensing opening of the pot located over an opening the platform. A plunger is then brought to bear against the body 32 of the pot and pressed so as to dispense the contents through the dispensing opening into a receptacle held below the dispensing platform. Since the disc 34 is rigid, it acts as a bearing surface to prevent the pot 30 being forced through the opening in the platform.

In a variation of the second embodiment, the separate rigid disc 34 may be replaced by a hardened portion or button formed in the top web 36 and in which a dispensing aperture is formed. The button would provide a seating for bearing against the plate or platform in the dispenser to enable the product to be exuded through the aperture.

Once the product is frozen solid, it can be stored in a freezer resting on its base with the lid facing uppermost. Any of the lid, the seal or the body of the pot can carry information such as an identification of the product and of the particular flavour of product with a particular package and this information can easily be seen to help a person in selecting the desired product flavour from amongst a selection of differently flavoured products.

A particular advantage of the invention described herein is that it enables a package to be made using relatively inexpensive materials and in a cost-effective continuous process for making the package whilst at the same time filling it with the food product. A flimsy web material is used for the food carrying portion of the package, namely the pot. As far as the lid portion is concerned this can either be made from a web which has rigidity enough to act as a bearing surface for the pot portion to collapse against during extrusion of the food product from the package or it can be formed from a flimsy material and the required bearing surface can be supplied by inserting a rigid insert into the package between the food product and the extrusion aperture.

Whilst the invention has been described particularly with reference to a single-serving package, it will be appreciated that the invention is equally suitable for the production of a package containing more than one sag. For example, a "family pack" containing 4 servings may be prepared and sold for domestic use and this is all the more realistic since the dispenser itself is a relatively simple device which can be bought by a householder and used to dispense soft-ices at home.

It will be appreciated that the invention is not limited to the specific details described herein, which are given by way of example only and that various modifications and alterations are possible within the scope of the invention as defined in the appended claims.

What is claimed is:

1. A process for packaging a food product comprising:
   a) advancing a base web of thermoformable material to a forming station and thermoforming a portion of the web at the forming station into at least one pot; and
   b) transferring the web with formed pot to a filling station and filling the pot with the food product;
   at the same time
   c) advancing a top web to a punching station and punching at least one product dispensing aperture in the top web;
   and thereafter conducting the further steps of
   d) bringing the base and top webs together in register so that an area of top web defining a lid and having the punched aperture therein overlies a mouth of a filled pot and sealing the lid to the pot to form a food package;
   e) advancing the package to a cooling chamber and holding the package suspended therein until the product in the package has solidified; and
   f) fixing a sealing member over the aperture at any point after step c.

2. A process according to claim 1 in which more than one pot is formed in the web at a time.

3. A process according to claim 2 in which a row, column or array of pots is formed at each pass of the forming station and simultaneously a corresponding number of lids is formed in the top web.

4. A process according to claim 3 in which the pot is deformable toward the lid to dispense the food product through the aperture in the lid and the lid or a portion thereof is provided with sufficient rigidity to enable the pot to be collapsed against it.

5. A process according to claim 3 in which the top web is thermoformed to fabricate it into a truncated dome-shaped lid and the aperture is formed in the planer surface of the dome.

6. A process according to claim 3 in which the aperture is shaped so as to impart a desired cross-sectional shape to product extruded through the aperture.

7. A process according to claim 3 in which the pot is deform able toward the lid to dispense the food product through the aperture in the lid and a rigid insert is provided intermediate the lid and the food product in the pot to provide a bearing surface against which the pot can be collapsed, the insert having a dispensing opening in register with the aperture of the lid to enable the food product to be dispensed therethrough.

8. A process according to claim 2 in which the pot is deformable toward the lid to dispense the food product through the aperture in the lid and the lid or a portion thereof is provided with sufficient rigidity to enable the pot to be collapsed against it.

9. A process according to claim 2 in which the top web is thermoformed to fabricate it into a truncated dome-shaped lid and the aperture is formed in the planer surface of the dome.

10. A process according to claim 2 in which the aperture is shaped so as to impart a desired cross-sectional shape to product extruded through the aperture.

11. A process according to claim 2 in which the pot is deformable toward the lid to dispense the food product through the aperture in the lid and a rigid insert is provided intermediate the lid and the food product in the pot to provide a bearing surface against which the pot can be collapsed, the insert having a dispensing opening in register with the aperture of the lid to enable the food product to be dispensed therethrough.

12. A process according to claim 1 in which the pot is deformable toward the lid to dispense the food product through the aperture in the lid and the lid including a hearing surface with sufficient rigidity to enable the pot to be collapsed against it.

13. A process according to claim 12 in which the top web is thermoformed to fabricate it into a truncated dome-shaped lid and the aperture is formed in the planer surface of the dome.

14. A process according to claim 12 in which the aperture is shaped so as to impart a desired cross-sectional shape to product extruded through the aperture.

15. A process according to claim 1 in which the top web is thermoformed to fabricate it into a truncated dome-shaped lid and the aperture is formed in the planer surface of the dome.

16. A process according to claim 15 in which the aperture is shaped so as to impart a desired cross-sectional shape to product extruded through the aperture.

17. A process according to claim 1 in which the aperture is shaped so as to impart a desired cross-sectional shape to product extruded through the aperture.

18. A process according to claim 1 in which the pot is deformable toward the lid to dispense the food product through the aperture in the lid and a rigid insert is provided intermediate the lid and the food product in the pot to provide a bearing surface against which the pot can be collapsed, the insert having a dispensing opening in register with the aperture of the lid to enable the food product to be dispensed therethrough.

19. A process according to claim 18 in which the dispensing opening is shaped so as to impart a desired cross-sectional shape to product extruded through the opening.

20. A process according to claim 19 in which a shoulder is formed adjacent the mouth of the pot for receiving the insert.

21. A process according to claim 18 in which a shoulder is formed adjacent the mouth of the pot for receiving the insert.

22. A process according to claim 1 in which the package is separated from the webs after the scaling of the aperture by cutting the area of webs between adjacent packages or groups of packages.

23. A process according to claim 1 in which the areas between adjacent packages and/or groups of packages is scored to enable individual packages or groups of packages to be snapped apart.

* * * * *